(12) United States Patent
Lobel

(10) Patent No.: US 8,043,146 B2
(45) Date of Patent: Oct. 25, 2011

(54) BUTCHERING PROCESSES FOR MEAT PRODUCTS

(75) Inventor: Stanley Lobel, Purchase, NY (US)

(73) Assignee: Lobel's Enterprises, LLC, Rye Brook, NY (US)

( * ) Notice: Subject to any disclaimer, the term of this patent is extended or adjusted under 35 U.S.C. 154(b) by 299 days.

(21) Appl. No.: 11/612,444

(22) Filed: Dec. 18, 2006

(65) Prior Publication Data

US 2007/0254580 A1    Nov. 1, 2007

Related U.S. Application Data

(63) Continuation of application No. 11/277,707, filed on Mar. 28, 2006, now Pat. No. 7,150,678.

(60) Provisional application No. 60/668,606, filed on Apr. 6, 2005.

(51) Int. Cl.
    *A22C 25/00* (2006.01)
(52) U.S. Cl. ....................................................... 452/157
(58) Field of Classification Search .................. 452/149, 452/156–158, 174, 198
    See application file for complete search history.

(56) References Cited

U.S. PATENT DOCUMENTS

| | | | | |
|---|---|---|---|---|
| 1,381,526 A | * | 6/1921 | Waters | 426/132 |
| 1,533,648 A | * | 4/1925 | Hawkinson | 426/315 |
| 1,604,764 A | * | 10/1926 | Block | 426/513 |
| 1,864,284 A | * | 6/1932 | Taylor | 426/420 |
| 2,046,118 A | * | 6/1936 | Gurney | 426/645 |
| 2,228,414 A | * | 1/1941 | Spang | 426/645 |
| 2,242,451 A | * | 5/1941 | Carpenter | 426/272 |
| 2,599,328 A | * | 6/1952 | Hoenselaar | 426/645 |
| 3,042,532 A | * | 7/1962 | Gordon | 426/132 |
| 4,313,963 A | * | 2/1982 | Greenspan | 426/58 |
| 4,337,275 A | * | 6/1982 | Adams | 426/104 |

(Continued)

FOREIGN PATENT DOCUMENTS

FR    2 598 887    11/1987

(Continued)

OTHER PUBLICATIONS

Beef Innovations Group news, http://www.beefinnovationsgroup.com/News.aspx with articles from Apr. 3, 2006 to Jul. 26, 2006 (seven pages total) including "Beef Innovations Group: New Name, New Product Powerhouse" (Jul. 26, 2006), "National Cattlemen's Beef Association Brings Knowledge and Expertise to the Market Through the Beef Innovations Group" (Jul. 3, 2006), "What's Next for Beef Value Cuts" (Jun. 30, 2006), "Shredded Beef Holds the Key to Profit Potential" (May 1, 2006), and "New Products Coming Alive in Retail Markets" (Apr. 3, 2006).
The Meat Buyer's Guide. Beef, Lamb, Veal, Pork, and Poultry. North American Meat Processors Association, John Wiley & Sons, Inc. (New Jersey, 2007), pp. cover, copyright p. 1, 4, 5, 17-23, 27, and 59.
Steven J. Jones et al., Bovine Myology & Muscle Profiling. Cattlemen's Beef Board and National Cattlemen's Beef Association (Colorado, 2005), pp. cover, 1-33, back cover.

(Continued)

*Primary Examiner* — Thomas Price

(74) *Attorney, Agent, or Firm* — Steptoe & Johnson LLP

(57) ABSTRACT

A method for mass-production butchering of a beef chuck roll includes locating an anterior side and a posterior side of the chuck roll, and making a first series of cuts into the chuck roll along lines not intersecting the anterior and posterior sides. The first series of cuts form a first set of separate beef portions with increasing weights from initial to final cuts in the first series. The method also includes making a second series of cuts into the chuck roll along lines not intersecting the anterior and posterior sides to form a second set of separate beef portions.

8 Claims, 2 Drawing Sheets

U.S. PATENT DOCUMENTS

| | | | | |
|---|---|---|---|---|
| 4,574,087 A | * | 3/1986 | Sheehy et al. | 426/129 |
| 4,818,556 A | * | 4/1989 | Hoashi | 426/615 |
| 5,030,472 A | * | 7/1991 | Logan, Jr. | 426/641 |
| 5,069,914 A | * | 12/1991 | Gagliardi, Jr. | 426/76 |
| RE35,374 E | * | 11/1996 | Logan, Jr. | 426/641 |
| 5,631,035 A | * | 5/1997 | Clarke et al. | 426/281 |
| 5,690,989 A | * | 11/1997 | Clarke et al. | 426/641 |
| 5,951,392 A | | 9/1999 | Gagliardi | 452/125 |
| 6,234,073 B1 | | 5/2001 | Dieso et al. | 99/538 |
| 6,413,073 B2 | | 7/2002 | McFarland | 425/382 R |
| 6,484,627 B1 | | 11/2002 | Peter | 99/538 |
| 6,929,540 B2 | | 8/2005 | Johnson et al. | 452/134 |
| 7,008,313 B2 | | 3/2006 | Gagliardi, Jr. | 452/135 |
| 7,065,880 B2 | | 6/2006 | Howman et al. | 30/114 |
| 7,070,824 B1 | | 7/2006 | Gore | 426/518 |
| 7,150,678 B2 | | 12/2006 | Lobel | 452/151 |
| 7,214,403 B1 | * | 5/2007 | Peters | 426/641 |
| 7,503,839 B2 | | 3/2009 | Lobel | 452/157 |
| 2005/0048892 A1 | | 3/2005 | Stockman | 452/149 |
| 2006/0240756 A1 | | 10/2006 | Lobel | 452/151 |
| 2007/0264920 A1 | | 11/2007 | Lobel | 452/149 |

FOREIGN PATENT DOCUMENTS

| | | |
|---|---|---|
| KR | 10-2006-0032330 | 4/2006 |

OTHER PUBLICATIONS

Bovine Myology & Muscle Profiling web pages, University of Nebraska, Lincoln, http://bovine.unl.edu/bovine3D/eng/ (1 page of home page; 8 pages entitled Similar to Item No. 116A Beef Chuck, Chuck Roll; 2 pages entitled "Item No. 116D Beef Chuck, Chuck Eye Roll").

Written Opinion and International Search Report for International Application No. PCT/US2008/052830.

The Sierra Cut. Cutting Guide. Cattlemen's Beef Board, 2008 (1 page).

The Sierra Cut. Cattlemen's Beef Board, 2008 (1 page).

Denver Cut, Sierra Cut, Delmonico Steak, Boneless Country-Style Beef Chuck Ribs, America's Beef Roast. Cattlemen's Beef Board and National Cattlemen's Beef Association, 2008 (5 pages).

The Denver Cut. Cattlemen's Beef Board, 2008 (4 pages).

The Denver Cut. Cattlemen's Beef Board, 2008 (1 page).

Delmonico Steak. Cutting Guide. Cattlemen's Beef Board, 2008 (1 page).

Delmonico Steak. Cattlemen's Beef Board, 2008 (1 pages).

Delmonico Steak. Cattlemen's Beef Board and National Cattlemen's Beef Association, 2008 (1 page).

* cited by examiner

BUTCHERING PROCESSES FOR MEAT PRODUCTS

CROSS-REFERENCE TO RELATED APPLICATION

This application is a continuation of U.S. patent application Ser. No. 11/277,707 filed Mar. 28, 2006, now U.S. Pat. No. 7,150,678, which in turn claims the benefits of Provisional Application No. 60/668,606 filed Apr. 6, 2005 and entitled "Butchering Processes for Meat Products" under 35 U.S.C. §119(e), and the entire contents of these applications are expressly incorporated herein by reference thereto.

FIELD OF THE INVENTION

The invention relates to a butchering process for meat products. More particularly, the invention relates to a butchering process for the chuck portion of a beef carcass.

BACKGROUND OF THE INVENTION

In the United States, the organized grading of cattle and beef has become particularly important in the promotion and marketing of quality products. Administered by the United States Department of Agriculture, the grading system is used to assign a distinct level of quality to cattle carcasses.

Carcass beef grades include a "yield grade" and a "quality grade." The yield grade, denoted by the numbers 1 through 5, generally refers to the degree of cutability of the carcass and serves as an indicator of the amount of closely trimmed (½ inch fat or less), boneless retail cuts expected to be derived from the major wholesale cuts of the carcass. "Yield Grade 1" represents the highest degree of cutability. The quality grade, on the other hand, separately indicates the palatability of the lean. Carcasses of steers and heifers may be graded as Prime, Choice, Select, Standard, Commercial, Utility, Cutter, and Canner, in descending order of quality; carcasses of cows may receive any of these grades except Prime. Bullock carcasses may be graded as Prime, Choice, Select, Standard, and Utility. Steers are considered male bovines castrated when young and which have not begun to develop the secondary physical characteristics of bulls, while heifers are considered young, such as less than 3 year old immature female bovines that have not developed the physical characteristics typical of cows, e.g., have not borne a calf. Cows are considered female bovines that have developed through reproduction or with age, the physical characteristics typical of mature females, and bullocks are considered young, such as under approximately 24 months of age, male bovines that have developed or begun to develop the secondary physical characteristics of bulls.

The highest quality grade, USDA Prime, is reserved for beef with abundant marbling (defined as flecks of fat within the lean muscle), thus providing a juicy and flavorful meat that also is tender, USDA Prime, for example, may have more than 8% intramunuscular fat, Only a small percent of all graded carcass beef qualifies as USDA Prime. As would be expected, Prime beef is favored by hotels and restaurants, is a successful commercial export product from the United States, and also is available through retail sales to discriminating consumers. Because it represents the highest quality, beef certified as USDA Prime commands the highest prices in the market.

The carcass typically refers to both sides of the animal, whereas a side refers to half of the carcass including both a frontquarter and a hindquarter. From the standpoint of profitability the hindquarter cuts of the carcass, which represent about half of a side of a beef carcass, traditionally have been greatest in demand. In particular, the hindquarter includes the full loin with the short loin and sirloin, the round, flank, and kidney knob. Thus, the hindquarter is the source of the well known beef cuts including the top loin steak, T-bone steak, porterhouse steak, tenderloin roast or steak (such as chateaubriand or filet mignon), top sirloin steak, sirloin steak, tenderloin roast or steak, beef tri-tip, round steak, top round roast or steak, and rump roasts.

The frontquarter, which represents the other half of a side of a beef carcass, includes the chuck, rib, plate, brisket and shank. Products typically produced from the frontquarter include cuts such as the rib roast or steak, rib eye roast or steak, back ribs, skirt steak, and whole brisket. The chuck, although used for such cuts as a pot roast (chuck roast), is not considered to be among the wholesale cuts that is most profitable and in demand. Beef from the chuck typically is transformed into lower cost ground beef chuck for example for use in producing ground beef chuck patties.

Once a carcass has been graded as Prime, each of the cuts from the carcass retain that designation. Thus, cuts from both the frontquarter and hindquarter are graded Prime, including the less profitable Prime chuck. There exists a need to make use of the chuck to produce steaks instead of simply being used as roasts or being ground into ground beef chuck. Moreover, there exists a need to make use of the Prime chuck to produce Prime steaks instead of simply being ground into Prime wound beef chuck. Because of the demand for the more costly cuts of Prime beef—which for example restaurants and hotels prefer to offer to customers—the ability to make use of Prime chuck for steaks may lead t) enhanced profitability derived from this portion of the carcass. There has been substantial industry interest in enhancing the value of the frontquarter. For example, scientists from the University of Nebraska and the University of Florida even conducted a study for the Cattlemen's Beef Board and analyzed more than 5,500 muscles of the beef chuck and round to assist in developing new beef products. Commercialization of the flat iron steak, a shoulder top blade steak cut from the chuck, is said to have resulted from the study. Nevertheless, the chuck is complex because of the number of muscles and associated fibers that do not run in the same direction as each other Thus, despite the efforts to date as described above, there remains a need for additional methods of producing products from the chuck.

The "fabrication" of the beef carcasses is conducted in mass-production operations by beef packers, who harvest finished cattle purchased from feedlots and create primal, subprimal, and sometimes consumer-ready cuts. The beef then is distributed to purveyors/processors or retailers for further sale. Thus, there is a need for additional methods of producing products from the chuck for use in the mass-production operations.

SUMMARY OF THE INVENTION

The invention relates to a method for mass-production butchering of a beef chuck roll including; locating the anterior side and posterior side of the chuck roll; making a first series of cuts into the chuck roll along lines not intersecting the anterior and posterior sides to form a first set of separate beef portions with increasing weights from initial to final cuts in the first sees, each beef portion having a thickness no greater than 1 inch; making a second series of cuts into the chuck roll along lines not intersecting the anterior and posterior sides to form a second set of separate beef portions each having a thickness greater than the thicknesses of the beef portions in the first set.

The separate beef portions in the second set each may have a seam of intramuscular fat, and the method further may include further cutting each of the beef portions in the second set proximate the seam to separate each beef portion into two subportions. The method also may include removing waste from at least one of the beef portions in the second set so that each of the subportions weighs between 8 oz. and 16 oz. In some embodiments, sinue is removed from at least one of the subportions.

As much as ¾ of the chuck roll may be cut in the first and second series leaving a remaining portion of at least ¼ of the chuck roll. The remaining portion may be cut into a plurality of portions. Each of the plurality of portions of the remaining portion may be sized for use as a pot roast or for use in beef stew. In addition, the method may include removing waste from the first set of beef portions so that each portion weighs between 8 oz. and 16 oz. Fat may be removed from at least one of the beef portions. Furthermore, the method may include aging the beef portions.

In some embodiments, the chuck roll includes abundant marbling.

The invention also relates to a method for mass-production butchering of a beef chuck roll comprising: locating the anterior side and posterior side of the chuck roll; making a first series of cuts into the chuck roll along lines not intersecting the anterior and posterior sides to form a first set of separate beef portions with increasing weights from initial to final cuts in the first series, each beef portion having a thickness between 1 inch and 2 inches; making a second series of cuts into the chuck roll along lines not intersecting the anterior and posterior sides to form a second set of separate beef portions.

BRIEF DESCRIPTION OF THE DRAWINGS

Preferred features of the present invention are disclosed in the accompanying drawings, wherein.

DETAILED DESCRIPTION OF THE PREFERRED EMBODIMENTS

The chuck is generally the shoulder region of the animal, and includes part of the neck and backbone, the first five ribs (U.S. packer/processors typically make the chuck/rib break between the 5th and 6th ribs), as well as portions of the shoulder blade and upper arm. It can weigh over 100 lbs.

Among the cuts derived from the chuck is the chuck roll, which is formed of muscle, fat, and connective tissue and typically weighs between 13 and 21 lbs. In particular, a beef chuck roll may be a generally oblong boneless portion of beef that is derived from a neck off boneless square-cut chuck (square blade chuck). The chuck roll may be produced from the upper portion of the chuck? In one preferred exemplary embodiment, the chuck roll includes the large muscle system that lies beneath the blade bone. The muscle system may be formed of the longissimus dorsi, rhomboideus, spinalis dorsi, complexus, multifidus dorsi, serratus ventralis, subscapularis and splenius. The chuck roll may not include the arm portion, which may be removed by a straight cut for example that is between 0 inch and 3 inches ventral from the longissimus dorsi at the rib end and between 0 inch and 4 inches from the complexus at the neck end. Also removed from the chuck roll may be any cartilages, bone chips, backstrap, trapezium, supraspinatus, intercostal meat (rib fingers), and prescapular lymph gland along with surrounding fat, blood clots, and dark discolored tissue. In alternate exemplary embodiments, the beef chuck roll may be a bone-in cut that includes portions of the blade bone, arm bone and/or backbone.

The chuck roll includes (1) a dorsal side, e.g., located toward the back of the animal, (2) a ventral side, e.g., located toward the belly/bottom of the animal, (3) an anterior side, e.g., toward the front or cranial end of the animal, and (4) a posterior side, e.g., located toward the rear or caudal end of the animal.

Figure 1:
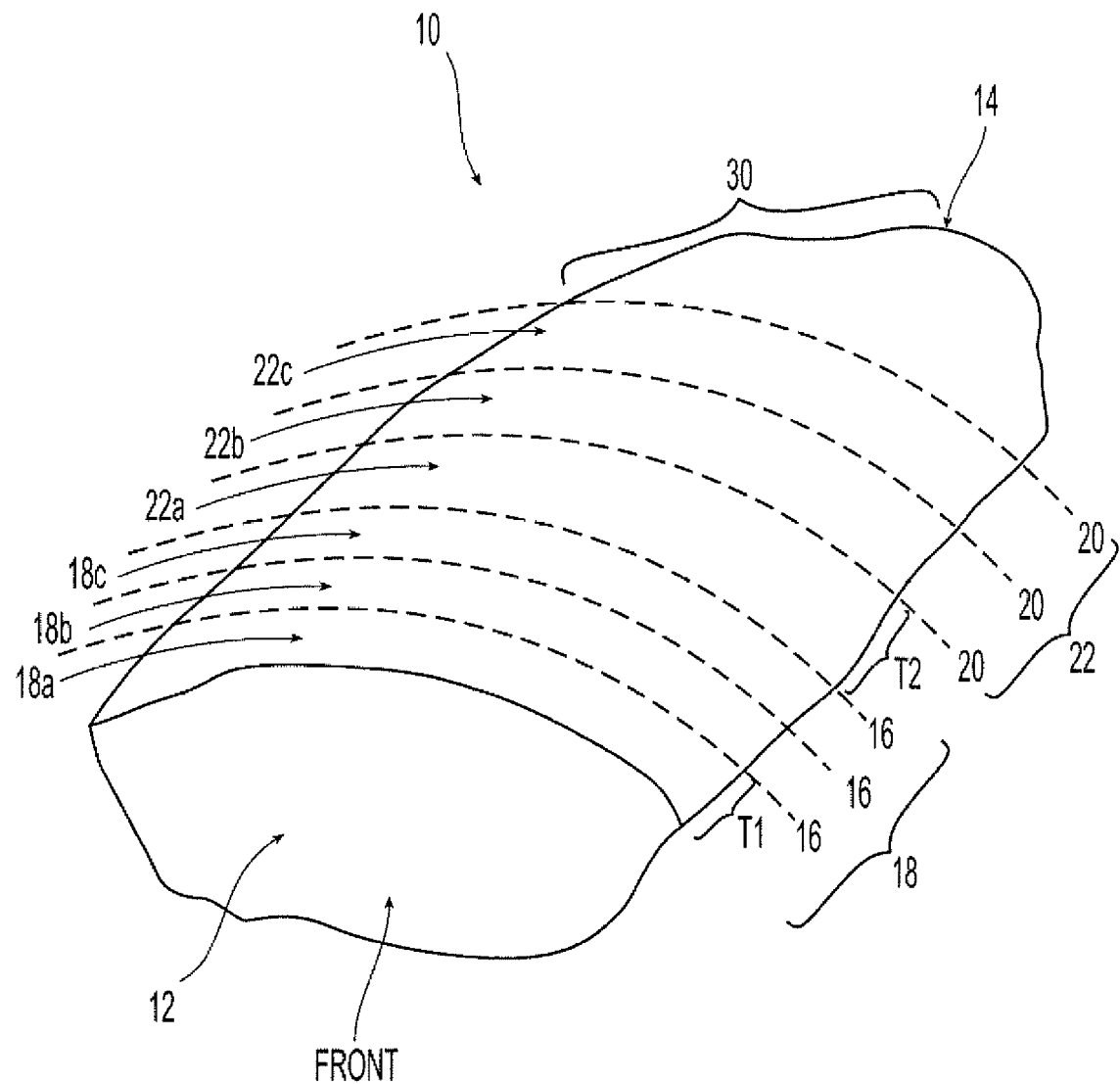
FIG. 1 is a perspective view of a beef chuck roll for use with the present invention.

In a first exemplary method for butchering a beef chuck roll 10 according to the present invention, suitable for example for use in mass-production butchering, the anterior side or front 12 and posterior side or back 14 of a chuck roll are initially identified. Next, a first series of cuts are made into the chuck roll along lines 16 not intersecting the anterior and posterior sides to form a first set of separate beef portions 18. Preferably, the first series of cuts are made so that each successive beef portion 18a, 18b, 18c has increasing weight. Moreover, in one preferred exemplary embodiment each beef portion 18a, 18b, 18c has a thickness no greater than 1 inch. In one exemplary embodiment, each beef portion 18a, 18b, 18c is about ¾ inch in thickness, as indicated for example by T1 in FIG. 1. In an alternate exemplary embodiment, each beef portion 18a, 18b, 18c has a thickness between 1 inch and 2 inches.

Figure 2:
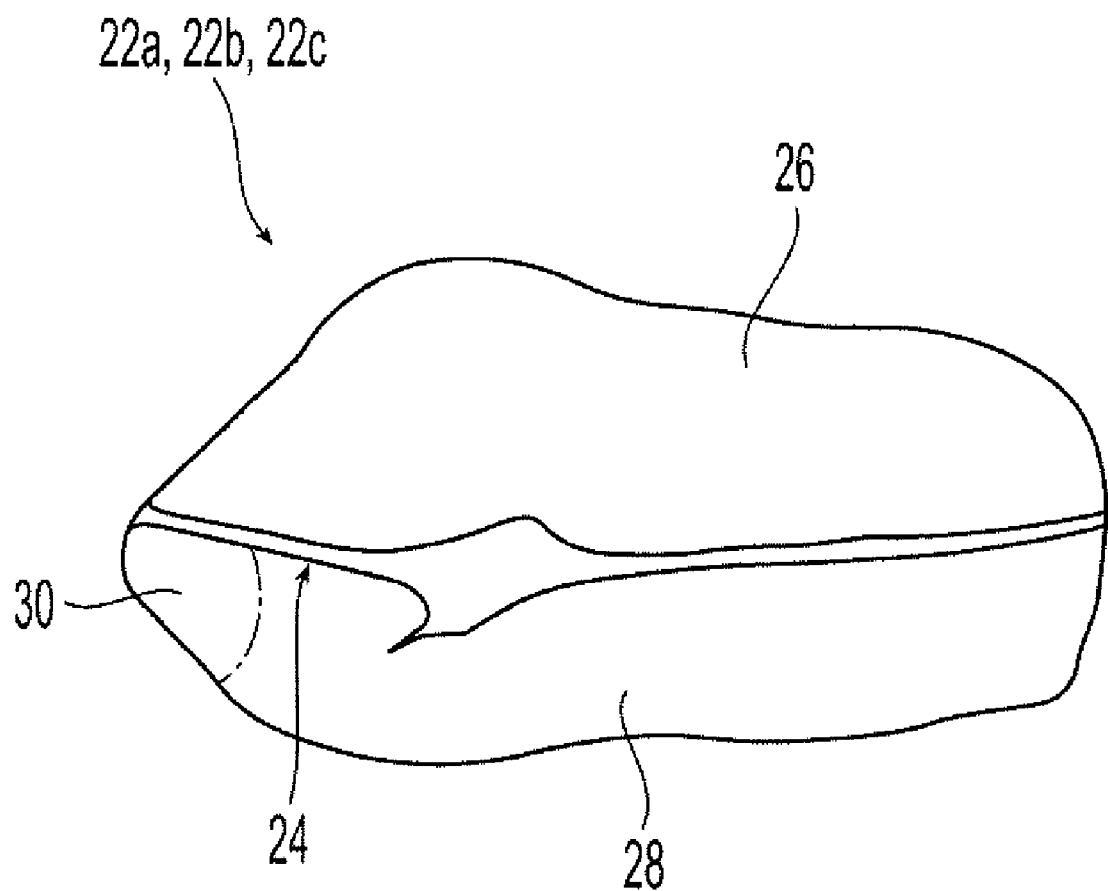
FIG. 2 is a front view of a beef portion in the second set of beef portions cut from the chuck roll of FIG. 1.

Next, a second series of cuts are made into the chuck roll along lines 20 not intersecting the anterior and posterior sides 12, 14, respectively, to form a second set of separate beef portions 22. In one preferred exemplary embodiment, each of the beef portions in the second set has a thickness greater than the thicknesses of the beef portions in the first set. As shown in FIG. 2, the separate beef portions 22a, 22b, 22c in the second set may each comprise a seam of intramuscular fat 24. Thus, one or more of the beef portions 22a, 22b, 22c in the second set may further be cut proximate the seam to separate each beef portion into two subportions 26, 28. In addition, waste may be removed from at least one of the beef portions in the second Set, such as proximate region 30 which may be more tough than desired for use in steaks, so that each of the subportions 26, 28 weighs between 8 oz. and 16 oz. In one exemplary embodiment, each beef portion 22a, 22b, 22c is about 1¼ inch in thickness, as indicated for example by T2 in FIG. 1. The method may further include removing the sinue from at least one of the subportions 26, 28.

In the exemplary preferred embodiment, as much as ¾ of the chuck roll is cut in the first and second series leaving a remaining portion 30 of at least ¼ of the chuck roll. Remaining portion 30 may be further cut into two or more portions, for example proximate the middle thereof from the anterior side 12 to the posterior side 14, thus forming sections suitable for use as pot roasts. Remaining portion 30 also may be sectioned into portions sized for use in beef stew. In some embodiments, remaining portion 30 is not further sectioned, but instead for example may be tied to form a larger pot roast.

In some instances, waste such as undesired muscle, fat, and/or connective tissue is removed from the first set of beef portions 18 so that each portion 18a, 18b, 18c weighs between 8 oz. and 16 oz. Also, fat may be removed from at least one of the beef portions of either set 18 or 22.

It should be noted that although each of sets 18, 22 is shown with three portions 16, 20, respectively, this example is non-limiting. Thus, depending on the size of chuck roll 10, other numbers of portions 16, 20 may be cut, such as more than three or less than three portions in either or both of sets 18, 22.

Preferably, chuck roll 10 has abundant marbling and is graded Prime, so that the portions of beef from chuck roll 10 also may be considered as Prime. Also, in preferred embodiments, the portions of beef cut from chuck roll 10 are aged.

In another exemplary embodiment of the present invention, other parts of a chuck are contemplated for use in producing steaks. For example, the neck off the arm chuck also may be used with the "bone in." Large beef portions or steaks from 14 oz. to 22 oz., and more preferably 16 oz. to 20 oz., are contemplated. Also, the shoulder portion of the chuck may be used for example for minute steaks, sandwich steaks, fry steaks, and steak on a bun. Beef portions of 3 oz. to 4 oz. are contemplated from the shoulder portion.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method for mass-production butchering of a portion of a beef chuck comprising multifidus dorsi, complexus, and longissimus dorsi muscles, the method comprising:
   sectioning the portion during the mass-production butchering along a seam thereof into subportions; and
   sectioning a subportion during the mass-production butchering into a plurality of steaks having a thickness no greater than about 2 inches.

2. The method of claim 1, wherein the portion is formed from a chuck roll.

3. A steak formed by the method of claim 1.

4. The steak of claim 3, wherein the steak is sized between about 14 oz, and about 22 oz.

5. The steak of claim 3, wherein the steak is sized between about 16 oz, and about 20 oz.

6. The steak of claim 3, wherein the steak has a thickness between about 1 inch and about 2 inches.

7. The steak of claim 3, wherein the steak has a thickness no greater than about 1 inch.

8. A roast formed by the method of claim 1.

* * * * *